United States Patent [19]
Atari et al.

[11] Patent Number: 5,413,360
[45] Date of Patent: May 9, 1995

[54] ELECTROSTATIC CHUCK

[75] Inventors: Hitoshi Atari, Kyoto; Kazuhiro Kuchimachi, Kokubu, both of Japan

[73] Assignee: Kyocera Corporation, Kyoto, Japan

[21] Appl. No.: 160,685

[22] Filed: Dec. 1, 1993

[30] Foreign Application Priority Data

Dec. 1, 1992 [JP] Japan .................. 4-322078
Apr. 1, 1993 [JP] Japan .................. 5-075672

[51] Int. Cl.⁶ .................................. B23Q 3/15
[52] U.S. Cl. .......................... 279/128; 361/234
[58] Field of Search ............. 279/128; 361/234; 269/8; 29/825, 829

[56]  References Cited
U.S. PATENT DOCUMENTS

| | | | |
|---|---|---|---|
| 4,431,473 | 2/1984 | Okano et al. | 156/345 |
| 4,908,074 | 3/1990 | Hosoi et al. | 148/33.2 |
| 5,103,367 | 4/1992 | Horwitz et al. | 361/234 |
| 5,104,834 | 4/1992 | Watanabe et al. | 501/127 |
| 5,151,845 | 9/1992 | Watanabe et al. | 361/234 |
| 5,207,437 | 5/1993 | Barnes et al. | 279/128 |
| 5,208,156 | 1/1994 | Niori et al. | 361/234 |

FOREIGN PATENT DOCUMENTS

| | | | |
|---|---|---|---|
| 63-95644 | 4/1988 | Japan | 269/8 |
| 404304941 | 10/1992 | Japan | 269/8 |
| 4050304941 | 2/1993 | Japan | 279/128 |

*Primary Examiner*—Steven C. Bishop
*Attorney, Agent, or Firm*—Spensley Horn Jubas & Lubitz

[57] ABSTRACT

An electrostatic chuck comprising a chucking body of a dielectric ceramics and an electrostatic inner electrode embedded in the chuck (first invention), the ceramics having a volume resistivity value not more than $10^{13}$ $\Omega$cm at a high temperature not less than 250° C. This electrostatic chuck can properly chuck, fix, carry and correct wafers even at a high temperature not less than 250° C. in CVD, PVD or high temperature etching apparatuses.

An electrostatic chuck comprising a chucking body of a single-crystalline sapphire and an electrostatic inner electrode embedded in the chuck (second invention). This electrostatic chuck is characterized by extremely small leak current, high mechanical strength and strong chucking force even in the temperature range of room temperature to 500° C. and in the voltage range of 500 to 2000 V. With this electrostatic chuck, objects to be chucked, such as silicon wafers, are less contaminated.

12 Claims, 8 Drawing Sheets

ELECTROSTATIC CHUCK

BACKGROUND OF THE INVENTION

1. Field of the Invention

The present invention generally relates to an electrostatic chuck for fixing and carrying wafers composed of silicon or the like in a semiconductor production apparatus. More particularly, it relates to an electrostatic chuck comprising a dielectric ceramic used at a high temperature not less than 250° C. in a CVD (chemical vapor deposition) apparatus, a PVD (physical vapor deposition) apparatus, etc. It also relates to an electrostatic chuck comprising a dielectric ceramic used in the temperature range of room temperature to 500° C.

Although these dielectric ceramics themselves are known, it has not been known that dielectric ceramics have the above-mentioned two different application capabilities. These capabilities have been known by the inventors of the present invention. In the disclosure of the present invention hereafter made, the dielectric ceramics used for the former is referred to as a first invention and the dielectric ceramics used for the latter is referred to as a second invention for the sake of explanation.

2. Prior Art

Clamp rings, vacuum chucks and electrostatic chucks have been used to fix and carry silicon wafers in semiconductor production apparatuses. In the case of vacuum chucks, however, since chucking is performed on the finished bottom surface side of each wafer only through the chucking holes of the vacuum chuck, the chucking force is not applied uniformly to the entire surface of the wafer. In addition to this disadvantage, since many semiconductor production processes are done under high vacuum ($10^{-3}$ or less), the vacuum chucks being operated by using vacuum suction force are frequently difficult to be used under such high vacuum. Clamp rings have no warp correction capability, causing nonuniform heating for larger wafers. It is therefore said that electrostatic chucks are useful for fixing and carrying silicon wafers in electron-beam drawing, dry-etching, CVD and PVD apparatuses.

This kind of electrostatic chuck has a structure wherein an electrostatic inner electrode is embedded in a dielectric material. The chucking force of such an electrostatic chuck is represented by the formula shown below.

$$F = S/2 \times \epsilon_o \times \epsilon_r \times (V/d)^2$$

wherein F is chucking force, S is an electrostatic electrode area, $\epsilon_o$ is a dielectric constant of vacuum, $\epsilon_r$ is a relative dielectric constant of a dielectric material, V is an applied voltage and d is the thickness of a dielectric layer.

According to the formula, to increase the chucking force, the following methods can be conceived.
 (1) To form a dielectric layer comprising a highly dielectric material
 (2) To apply high voltage
 (3) To decrease the thickness of the dielectric layer The electrostatic chuck based on the method (1) has already been proposed by the applicants of the present invention by using a ceramics mainly composed of calcium titanate (highly dielectric material) as a dielectric material (Japanese Patent Application Laid-open Publication No. 4-206948). The electrostatic chucks based on the methods (2) and (3) cause dielectric breakdown at the dielectric layer and are not used practically.

Other than the electrostatic chucks based on the above-mentioned methods (1) to (3), an electrostatic chuck has also been proposed which uses a ceramics made by adding transition elements such as titanium to an alumina material and by sintering the material in a reduction atmosphere to decrease the volume resistivity of the ceramics (Japanese Patent Application Laid-open Publication No. 2-22166). This electrostatic chuck uses a ceramics having low volume resistivity as a dielectric layer to generate minute leak current at the time of voltage application, thereby increasing the chucking force thereof (Johnse-Rahbeck's force).

However, the electrostatic chuck, which uses such leak current as disclosed by the above-mentioned Japanese Patent Application Laid-open Publication No. 2-22166, has various problems as described below.

First, this electrostatic chuck is intended to be used in the temperature range of $-100°$ to $150°$ C. in electron-beam drawing and dry-etching apparatuses, for example. It is therefore not suited for applications at a higher temperature. More particularly, the volume resistivity of the dielectric material of this electrostatic chuck decreases as the temperature rises. As a result, the leak current becomes excessive at a high temperature not less than 250° C. used in deposition apparatuses such as CVD and PVD apparatuses or high-temperature dry-etching apparatuses, thereby breaking the circuits formed on wafers.

Second, since the volume resistivity of the ceramics used for this electrostatic chuck is controlled depending on sintering conditions, it is necessary to obtain a completely uniform atmosphere in the entire furnace. Even a slight nonuniformity in the atmosphere changes the volume resistivity. It is therefore difficult to control the volume resistivity by using this method, and products having uniform quality cannot be obtained by this method. For this reason, this electrostatic chuck is disadvantageous to mass product ion.

Furthermore, since the above-mentioned ceramic is a mixture of alumina and titanium, its chucking force depends on time. It has a serious disadvantage that sufficient chucking force cannot be obtained immediately after voltage is applied. This problem is assumed to be caused by the fact that titanium is not dispersed uniformly and that titania is generated by oxidation of titanium and a material having a significantly different relative dielectric constant (alumina=10, titania=46) is dispersed. The chucking force which depends on time causes the problem of decreasing the wafer processing capability in semiconductor production apparatuses.

On the other hand, in the case of the electrostatic chuck comprising a highly dielectric ceramic as disclosed by Japanese Patent Application Laid-open Publication No. 4-206948, the highly dielectric ceramic is low in mechanical strength and heat shock resistance. The electrostatic chuck is thus impractical in use at a temperature not less than 250° C.

When using an electrostatic chuck at a temperature not less than 250° C. in CVD, PVD and high-temperature etching apparatuses, the electrostatic chuck must have the following characteristics in general.
 (1) Must have high chucking force.
 (2) Must have highly responsive chucking and releasing operations.
 (3) Leak current must be small.

(4) Must have sufficient mechanical strength and rigidity to withstand stress during assembly.
(5) Must have sufficient resistance against heat shock.
(6) Must have high heat conductivity.
(7) Must be composed of materials not adversely affecting wafers.

Regarding the item (1), the contact between the electrostatic chuck and a wafer is enhanced by high chucking force. The temperature of the wafer can be made close to that of the electrostatic chuck, making the temperature distribution on the wafer surface uniform. Uniform films can thus be formed on wafers by CVD and PVD apparatuses, and finer patterns can be obtained by high-temperature etching apparatuses. The characteristic in the item (2) is essential to enhance the through-put of wafers.

Regarding the item (3), when temperature rises, the volume resistivity of a dielectric material decreases as its own characteristic and the leak current in the material increases. If the leak current is excessive, the danger of breaking the patterns formed on wafers is caused. Furthermore, regarding the item (4), when an electrostatic chuck is assembled in an apparatus operating at a high temperature, the electrostatic chuck must be secured mechanically by using screws or the like or joined by heat resistant joining (by brazing, etc.). The electrostatic chuck must thus have sufficient mechanical strength to withstand the stress generated during screw tightening or the stress caused by the difference in thermal expansion during temperature change. Furthermore, the electrostatic chuck must also have high rigidity, since the surface and shape of the electrostatic chuck must be finished highly accurately to allow highly fine patterns to be formed on wafers.

Regarding the item (5), the electrostatic chuck must be superior in heat shock resistance to withstand the thermal strain due to nonuniform temperature distribution inside the electrostatic chuck when the bottom surface of the electrostatic chuck is cooled for temperature control of wafers or when the electrostatic chuck is used at a high temperature. In addition, regarding the item (6), the material of the electrostatic chuck which makes contact with wafers is desired to be superior in heat conductivity. This is because nonuniform temperature distribution caused on the wafer surface during wafer processing makes uniform filming and fine pattern forming very difficult. Moreover, regarding the item (7), the electrostatic chuck must be composed of elements which do not adversely affect silicon wafers to prevent the chuck from deteriorating the characteristics of silicon wafers, since the electrostatic chuck directly contacts wafers.

In spite of these requirements to be satisfied, a conventional electrostatic chuck comprising a ceramics with titanium added to alumina has large leak current and is inferior in responsivity as described above. On the other hand, another conventional electrostatic chuck comprising a highly dielectric ceramics is inferior in mechanical characteristics. Accordingly, these conventional electrostatic chucks cannot satisfy the characteristic requirements in the above-mentioned items (1) to (7).

In the case of electrostatic chucks used in the relatively low temperature range of room temperature to less than 250° C., not used in the above-mentioned high temperature range, an electrostatic chuck composed of synthetic resin has been used conventionally. However, this type of electrostatic chuck has many problems; its service life is short because of its low wear resistance and low heat resistance; it cannot achieve sufficient flatness and pallelism required for processing wafers. Furthermore, the resin is low in dielectric constant, making dielectric polarization difficult. Although high voltage must be applied to obtain practically strong chucking force, since the resin is low in dielectric strength, high voltage cannot be applied to the electrostatic chuck. The obtained chucking force is therefore limited. For these reasons, the electrostatic chuck composed of synthetic resin is not yet practical. Besides, the electrostatic chuck cannot be used at a temperature not less than 50° C. because of the low heat resistance of the resin.

To overcome these difficulties, instead of using the electrostatic chucks composed of synthetic resin, electrostatic chucks composed of polycrystalline ceramics superior in corrosion resistance, wear resistance and accuracy have been used these days. As this polycrystalline ceramic material, a ceramics including $Al_2O_3$ as a main ingredient and $TiO_2$ (Japanese Patent Application Laid-open Publication No. 62-264638) and highly dielectric ceramics such as $CaTiO_3$ and $BaTiO_3$ (Japanese Patent Application Laid-open Publication No. 2-339325) proposed by the applicants of the present invention have been examined.

The electrostatic chuck composed of alumina ceramics including the above-mentioned $TiO_2$ has a volume resistivity value of about $10^{11}$ Ωcm and its chucking force is obtained by minute leak current. In actual practice, however, a few mA of leak current flows and the electrostatic chuck has the danger of adversely affecting the circuits formed on silicon wafers.

In addition, the electrostatic chuck composed of highly dielectric ceramics is relatively low in mechanical strength and its chucking characteristic is not constant when used in a reduction atmosphere. The electrostatic chuck must thus be used in limited environments.

SUMMARY OF THE INVENTION

The object of the first invention of the present invention is to provide an electrostatic chuck composed of dielectric ceramics being capable of satisfying the characteristics in the above-mentioned items (1) to (7) and suitably used at a high temperature not less than 250° C.

The object of the second invention of the present invention is to provide an electrostatic chuck having relatively high mechanical strength, having a characteristic of preventing the impurities therein from diffusing to wafers and being able to be used in the temperature range of room temperature to 500° C. at a high voltage of 500 to 2000 V. As clearly disclosed by the following description, it should be noted that the electrostatic chuck composed of single-crystalline sapphire is suited for both the first and second inventions. The first and second inventions will be explained below in detail referring to the attached drawings.

DETAILED DESCRIPTION OF THE INVENTION

The electrostatic chuck of the first invention relates to an electrostatic chuck comprising a chucking body of dielectric ceramics and an electrostatic inner electrode embedded in the chuck, the ceramics having a volume resistivity value not more than $10^{13}$ Ωcm at a high temperature not less than 250° C. The volume resistivity value of $10^{13}$ Ωcm is determined herein because of the following reasons. If the value is more than $10^{13}$ Ωcm, the leak current at the time of voltage application is too small to obtain sufficient chucking force. In preferred structural embodiments, the lower limit of the resistivity is set at $10^8$ Ωcm. In this case, the upper limit temperature range is approximately between about 600° and about 650° C. If the volume resistivity value is less than $10^8$ Ωcm, the leak current becomes excessive and causes adverse effects, such as breakdown of the circuits on wafers chucked.

The above-mentioned ceramics can be composed of oxides or nitrides of silicon (Si) or aluminum (Al), having a flexural strength not less than 20 kg/mm$^2$, a heat conductivity value not less than 10 W/m.K and a heat shock resistance ΔT not less than 150° C.

Examples of the First Invention

The examples of the first invention are explained below.

(First Example)

Figure 1:
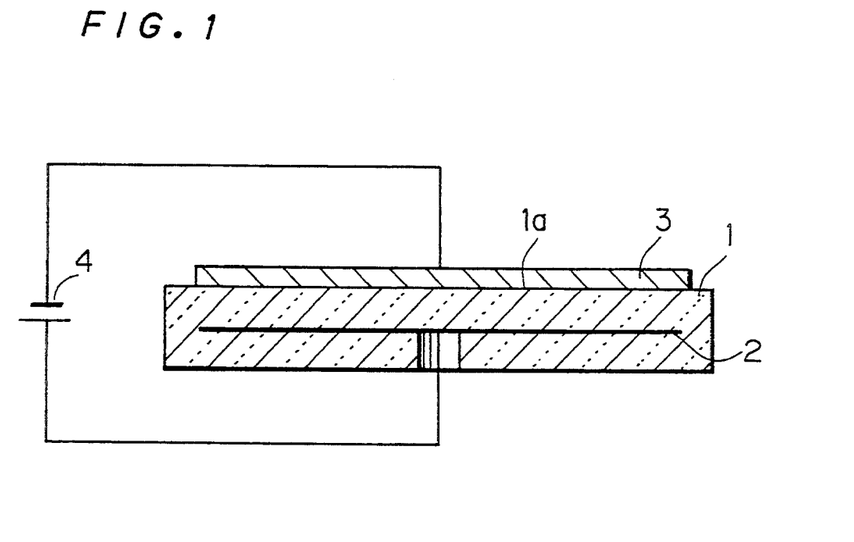
FIG. 1 is a vertical sectional view of a first example of the first invention of the present invention.

As shown in FIG. 1, the electrostatic chuck of the first example of the first invention has an electrostatic inner electrode 2 embedded in a chucking body 1 of a dielectric ceramics (hereafter referred to only as chucking body 1). Chucking force is generated by applying voltage 4 between the electrostatic inner electrode 2 and an object 3 to be chucked so that the object 3 can be secured on a chucking surface 1a. The above-mentioned ceramics (chucking body 1) has a volume resistivity value not less than $10^{14}$ Ωcm at room temperature. Since this value is large, leak current is very small and chucking force to be generated is negligible. At a temperature not less than 250° C., however, the volume resistivity decreases to values in the range of $10^8$ to $10^{13}$ Ωcm and the leak current thus increases, thereby generating chucking force.

Each of the above-mentioned ceramics is composed essentially of alumina (Al$_2$O$_3$), sapphire (single-crystalline alumina), aluminum nitride (AlN) or silicon nitride (Si$_3$N$_4$) as a main ingredient. To have the above-mentioned volume resistivity value, each of the ceramics must be composed of about 85 weight % of such a main ingredient. Additionally, as described below, to prevent wafers from being contaminated, impurities composed of elements other than aluminum (Al), silicon (Si), oxygen (O) and nitrogen (N) should preferably be not more than 0.2 weight % in total.

For example, in the case of alumina ceramics, it is preferable that the ceramics is composed of not less than 85 weight % of Al$_2$O$_3$ (main ingredient) and that the remainder is SiO$_2$, including not more than 0.2 weight % of all impurities such as Ca and Na. It is also preferable that the ceramics is composed of not less than 99.8 weight % of Al$_2$O$_3$ (main ingredient). In the case of aluminum nitride ceramics, it is preferable that the ceramics is composed of not less than 99.8 weight % of AlN (main ingredient). Furthermore, in the case of silicon nitride ceramics, it is preferable that the ceramics is composed of not less than 85 weight % of Si$_3$N$_4$ (main ingredient) and that the remainder is Al$_2$O$_3$, including not more than 0.2 weight % of impurities.

Materials composed of these compositions are formed into a plate shape by press forming or by green sheet lamination, then fired in predetermined conditions to obtain the above-mentioned chucking body 1. It is also possible to form a flame sprayed film or CVD film composed of not less than 85 weight % of alumina, silicon nitride or aluminum nitride as the main ingredient on the electrode surface having a predetermined strength.

When sapphire is used for forming, the material is pulled up in a sheet form by the EFG method and processed to have a predetermined shape to obtain the chucking body 1.

The above-mentioned ceramics to be used must have a flexural strength not less than 20 kg/mm$^2$ to offer superior mechanical strength, a heat shock resistance ΔT not less than 150° C. to offer superior resistance against heat shock, and a heat conductivity value not less than 10 W/m.K to offer excellent conductivity. Furthermore, since these ceramics are composed of elements such as aluminum (Al), silicon (Si), oxygen (O) and nitrogen (N), wafers are not adversely affected. Moreover, the above-mentioned ceramics have superior responsivity at the time of chucking since they are respectively composed of a single main ingredient. Uniform materials can thus be produced easily.

Although a unipolar type electrostatic chuck is indicated in the first example, it is possible to obtain a bipolar type electrostatic chuck by providing two electrostatic inner electrodes embedded therein and by applying voltage between the two electrostatic inner electrodes.

(Second Example)

Figure 2:
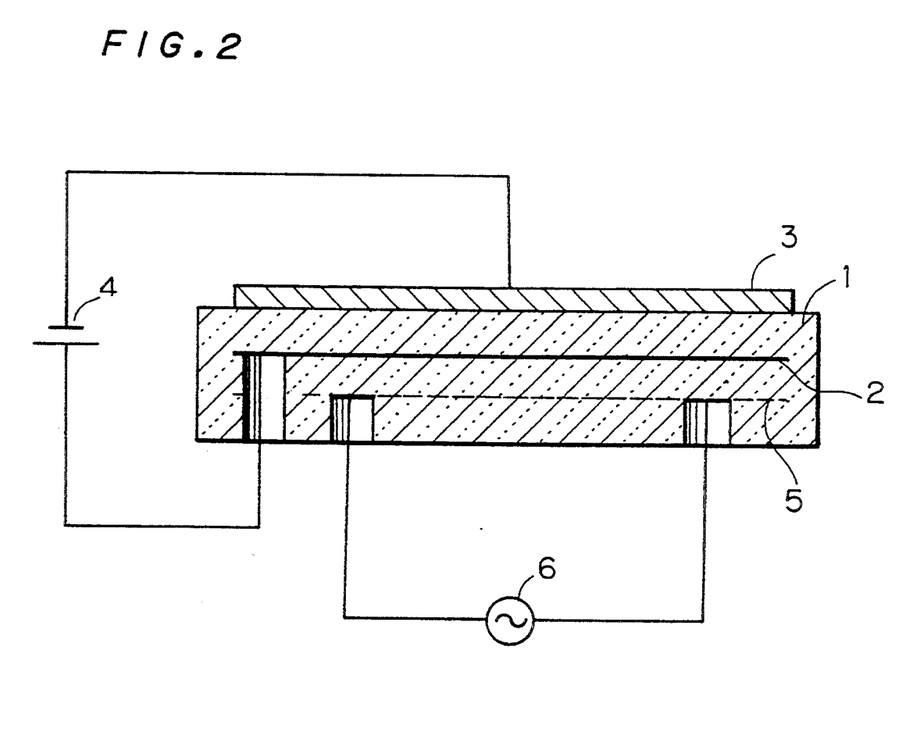
FIG. 2 is a vertical sectional view of a second example of the first invention.

Additionally, as shown in FIG. 2 illustrating the second example of the first invention, it is possible to form an electrostatic chuck by embedding a heater 5 together with an electrostatic inner electrode 2 in a chucking body 1. In this case, the chucking body 1 is heated to not less than 250° C. by applying voltage 6 to the heater 5, and minute leak current is generated in the chucking body 1 by applying voltage 4 between the electrostatic inner electrode 2 and an object 3 to be chucked, thereby generating chucking force. In this way, in the case of the electrostatic chuck with the embedded heater 5, it is easy to control the temperature of the chucking body 1 so that a predetermined chucking force is obtained and this type of electrostatic chuck can be used more preferably.

(Test Example 1)

The electrostatic chuck of the first invention generates chucking force by using minute leak current. To obtain a suitable chucking force, it is important that the chucking body thereof must have an appropriate volume resistivity value. To examine the resistivity value, the chucking body 1 composed of alumina ceramics having a volume resistivity value not less than $10^{14}$ Ωcm at room temperature was used to prepare a unipolar type electrostatic chuck with the heater 5 embedded as shown in FIG. 2. In a vacuum of $10^{-1}$ Torr, voltage 4 (300 V) was applied between the electrostatic inner electrode 2 of the electrostatic chuck and the object 3 to be chucked. While raising the temperature of the electrostatic chuck, the object 3 to be chucked was taken off vertically and the chucking force of the electrostatic chuck was measured.

Figure 3:
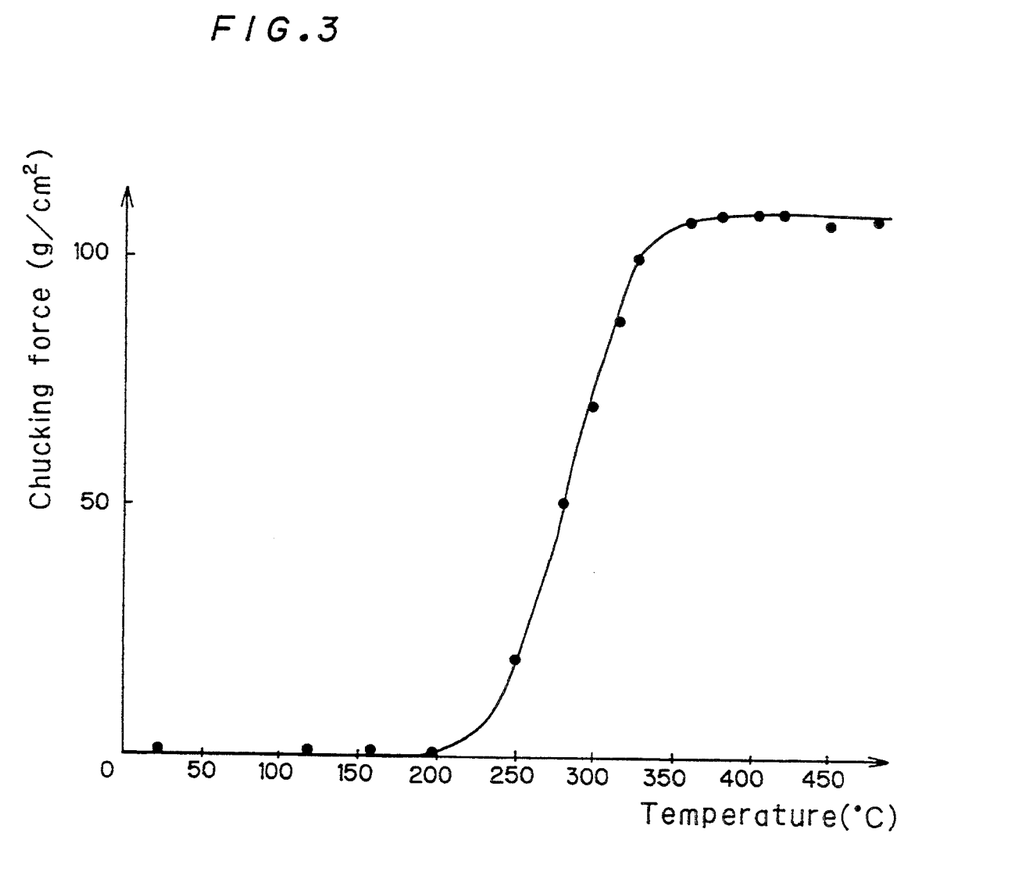
FIG. 3 is a graph illustrating the relationship between the temperature and the chucking force of the electrostatic chuck of the second example.

As the result of the test, as shown in FIG. 3 illustrating the relationship between the chucking force and temperature, the chucking force increases abruptly around 250° C. and becomes almost constant around 400° C., generating a sufficient chucking force not less than 100 g/cm$^2$. When this result is compared with the relationship between the volume resistivity of the above-mentioned alumina ceramics and temperature illustrated in the graph shown in FIG. 4, it is confirmed that a sufficient chucking force can be generated when the temperature is not less than 250° C. and the volume resistivity value is not more than $10^{13}$ Ωcm. However, considering that the circuits on wafers will be broken if the leak current is excessive, the volume resistivity value should preferably be in the range of $10^8$ to $10^{13}$ Ωcm. It is thus understood that the electrostatic chuck composed of the above-mentioned alumina ceramics can be used preferably in the temperature range of 250° to 600° C.

Figure 4:
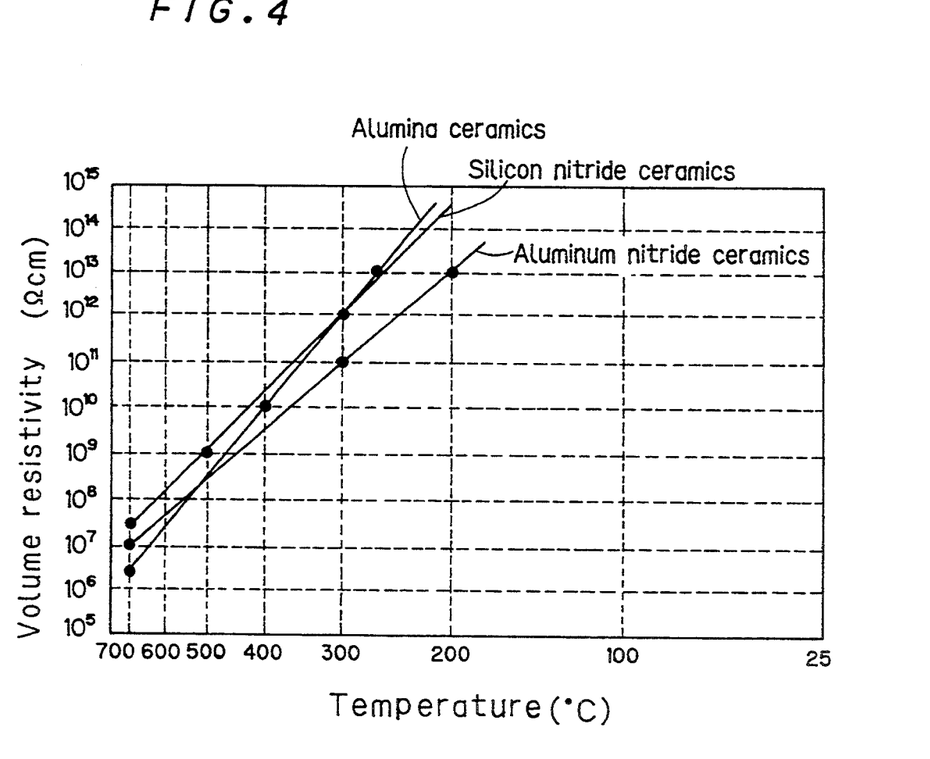
FIG. 4 is a graph illustrating the relationship between temperature and the volume resistivity of the electrostatic chuck of the first invention.

Additionally, FIG. 4 shows the relationship between temperature and the volume resistivity values of ceramics composed of silicon nitride and aluminum nitride. The volume resistivity values of these ceramics are in the range of $10^8$ to $10^{13}$ Ωcm when temperature is in the range of 250° to 600° C. When electrostatic chucks were composed of these ceramics and tested, it was confirmed that they generated sufficient chucking forces not less than 100 g/cm$^2$ at a temperature not less than 250° C. in the same way as the case of the above-mentioned chucking body composed of alumina ceramics.

While sapphire, i.e., single-crystalline alumina ceramics, has a large volume resistivity value, it can be used sufficiently at a temperature not less than 400° C.

(Test Example 2)

Next, to examine how the chucking forces of electrostatic chucks depend on time, the following two electrostatic chucks were prepared.

(1) An alumina ceramics electrostatic chuck having a volume resistivity value not less than $10^{14}$ Ωcm at room temperature and having a lower value, $10^{11}$ Ωcm, at 400° C. (an example of the first invention)

(2) An electrostatic chuck having a volume resistivity value of $10^{11}$ Ωcm at room temperature, which was made by adding transition elements such as titanium to alumina material and by firing the mixture at a reduction atmosphere (a comparison example)

Figure 5:
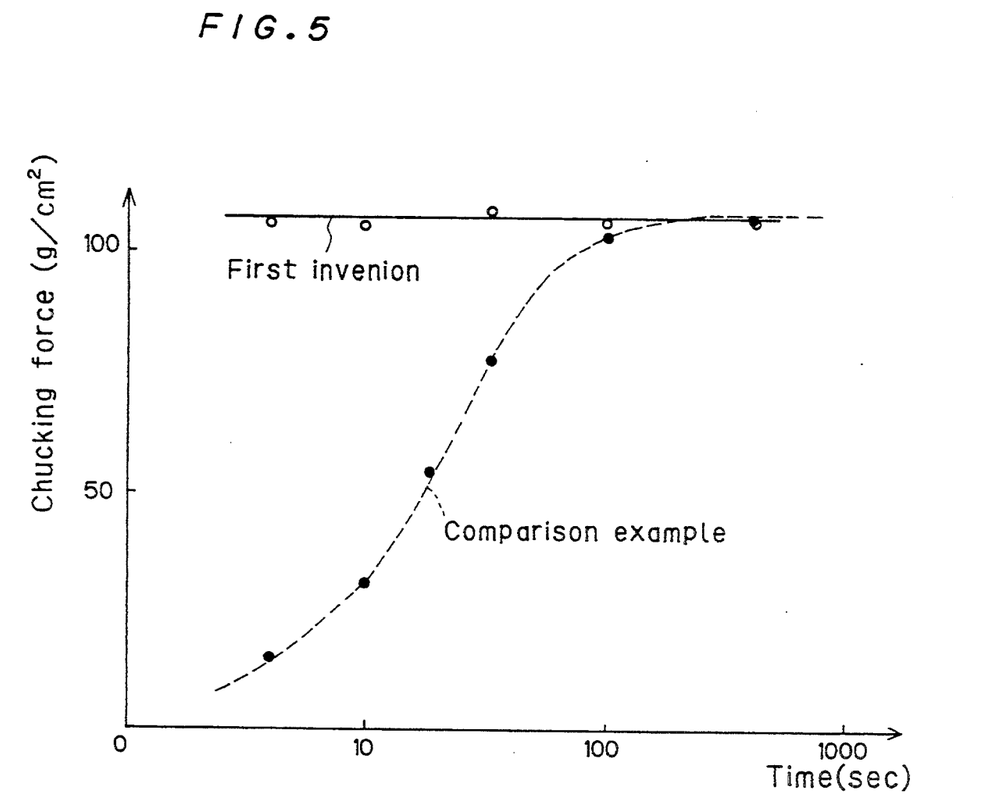
FIG. 5 is a graph illustrating the relationship between time and the chucking forces of the electrostatic chucks of the first invention and a comparison example.

To test the above-mentioned two examples at the same volume resistivity, the chucking force depending on time for the example (2) was measured at room temperature, and that for the example (1) was measured at 400° C. (at a vacuum of $10^{-1}$ Torr and a voltage of 300 V for both examples). According to FIG. 5 which shows the result, the example (2) (a comparison example) takes about 200 seconds until a predetermined chucking force is obtained. The example (1) (an example of the first invention) takes only about 1 second until the predetermined chucking force is obtained. It is thus understood that the chucking force of the electrostatic chuck of the first invention does not depend on time and the electrostatic chuck is superior in chucking and releasing responsivity.

This is because the example of the first invention is composed of a single material, instead of complex materials used for the comparison example.

Although similar tests were conducted by preparing electrostatic chucks composed of aluminum nitride and silicon nitride ceramics instead of alumina ceramics, the results were almost the same and no noticeable differences were found in graphic expressions. Accordingly, the line for indicating the example of the first invention shown in FIG. 5 can also represent the lines for indicating the above-mentioned electrostatic chucks composed of three different ceramics.

(Test Example 3)

Next, experiments were conducted regarding heat stress to confirm the applicability of electrostatic chucks at a high temperature. Six-inch diameter electrostatic chucks were prepared by using alumina ceramics having various characteristics listed in Table 1 and the following experiments were conducted.

(1) Temperature was raised abruptly to 500° C. at a rate of 50° C./minute.
(2) Each electrostatic chuck was assembled with fixtures by screw tightening and temperature was raised gradually to 500° C.

In Table 1, the strength is flexural strength at room temperature and the heat shock resistance is temperature difference ΔT wherein cracks occur when a sample is dropped into water.

According to the test results shown in Table 1, in the case of electrostatic chucks having a heat shock resistance ΔT not more than 150° C. (samples C and D), cracks occurred at the experiment (1). In the case of electrostatic chucks having a strength not more than 20 kg/mm$^2$ (samples B and D), cracks occurred at the experiment (2). Accordingly, it is necessary to use ceramics having a strength not less than 20 kg/mm$^2$ and a heat shock resistance temperature not less than 150° C. when they are used at a high temperature.

[TABLE 1]

| | Sample | | | |
|---|---|---|---|---|
| Item | A | B | C | D |
| Strength (kg/mm$^2$) | 23 | 18 | 21 | 19 |
| Heat shock resistance temperature (°C.) | 150 | 170 | 120 | 140 |
| Experiment ① results | ○ | ○ | x | x |
| ② | ○ | x | ○ | x |

(Note) All of samples A to D are composed of alumina ceramics and their compositions are as follows:

A: 93 weight % of Al$_2$O$_3$, remainder SiO$_2$
B: 76 weight % of Al$_2$O$_3$, remainder SiO$_2$
C: 91 weight % of Al$_2$O$_3$, remainder SiO$_2$
D: 85 weight % of Al$_2$O$_3$, remainder SiO$_2$ Experiment Results o: No problem
x: Cracks or fractures occurred.

(Test Example 4)

Experiments were conducted to confirm the enhancement of heat uniformity by using electrostatic chucks and also to confirm heat conductivity required for heat uniformity. As shown in Table 2, six-inch diameter electrostatic chucks composed of ceramics having various heat conductivity values and equipped with the embedded healer shown in FIG. 2 were prepared, and the following experiments were conducted.
(1) After the central portion of each electrostatic chuck was heated to 300° C., a wafer was placed on the electrostatic chuck and the temperature distribution of the surface thereof was checked by using a thermoviewer (surface thermometer).
(2) After the central portion of each electrostatic chuck was heated to 300° C., a wafer was placed on the electrostatic chuck and chucked by the electrostatic chuck, then the temperature distribution of the surface thereof was checked by using a thermoviewer (surface thermometer).

The results of the experiments are shown in Table 2. It is assumed that uniform wafer filming is possible when temperature differences are not more than 20° C. Temperature differences within this range are achieved only when electrostatic chucks having a heat conductivity value not less than 10 W/m.K (samples C and D) are used for chucking. Accordingly, uniform wafer filming is possible by using chucks composed of ceramics having a heat conductivity value not less than 10 W/m.K.

More preferably, chucks composed of aluminum nitride ceramics should be used to obtain better results, since the ceramics has an extremely high heat conductivity value not less than 70 W/m.K.

[TABLE 2]

| Item | | Sample | | | |
|---|---|---|---|---|---|
| | | A | B | C | D |
| Heat conductivity (W/mK) | | 5 | 8 | 10 | 12 |
| Experiment results | ① (°C.) | 220–300 Δ80 | 230–300 Δ70 | 240–300 Δ60 | 250–300 Δ50 |
| | ② (°C.) | 250–300 Δ50 | 270–300 Δ30 | 280–300 Δ20 | 285–300 Δ15 |

(Note)
A: Zirconia ceramics
B: Silicon nitride ceramics, 84 weight % of Si$_3$N$_4$
C: Silicon nitride ceramics, 88 weight % of Si$_3$N$_4$
D: Silicon nitride ceramics, 92 weight % of Si$_3$N$_4$ (Test Example 5)

Experiments were conducted to examine the relationship between the amount of impurities included in ceramics used for electrostatic chucks and the contamination degree of wafers. As listed in Table 3, electrostatic chucks composed of ceramics including alumina (main ingredient) and different amounts of Na and Ca (impurities) were prepared. After silicon wafers including not more than 1 ppm of Na and Ca were chucked by the prepared electrostatic chucks, the contamination degrees of the wafers (the contents of Na and Ca) of the wafer were measured.

According to the results shown in Table 3, as indicated by samples C and D, it is understood that the contamination degrees of wafers chucked are low when the total amount of impurities in the alumina ceramics used for the electrostatic chucks is not more than 2000 ppm (0.2 weight %). Although only the chucks composed of alumina ceramics were indicated in this test example, chucks composed of other ceramics can also be used to prevent adverse effects to wafers by extremely reducing the amount of impurities in the same way as the chucks composed of alumina ceramics. Chucks composed of sapphire are particularly preferable. The impurities herein refer to ingredients including elements other than silicon (Si), aluminum (Al), oxygen (O) and nitrogen (N).

[TABLE 3]

| Item | Sample | | | |
|---|---|---|---|---|
| | A | B | C | D |
| Content of Na (ppm) | 3000 | 1500 | 900 | 500 |
| Content of Ca (ppm) | 1000 | 600 | 200 | 150 |
| Contamination degree of wafer (ppm) | 10 | 3 | <1 | <1 |

(Note) All the samples A to D are composed or 93 weight % of Al$_2$O$_3$ and the remainder is SiO$_2$. The contents of impurities (Na and Ca) were changed as listed above.

The electrostatic chuck of the second invention relates to an electrostatic chuck comprising a chucking body of single-crystalline sapphire and an electrostatic inner electrode in the chuck.

According to the second invention, since the dielectric material used for the electrostatic chuck comprises the chucking body of single-crystalline sapphire, the electrostatic chuck has high dielectric strength in the temperature range of room temperature to 800° C. and generates extremely small leak current, thereby not adversely affecting the circuits formed on silicon wafers.

In addition, since the dielectric constant of the single-crystalline sapphire is not as high as that of dielectric ceramics such as CaTiO$_3$, high voltage must be applied to obtain the predetermined chucking force. However, unlike polycrystalline ceramics, single-crystalline sapphire has very few grain boundaries and defects, and thus has high dielectric strength. High voltage can thus be applied to the single-crystalline sapphire and a sufficient chucking force can thus be obtained.

Furthermore, single-crystalline sapphire is superior in heat radiation performance, that is, its heat conductivity value is 41 W/m.K, twice as high as that of alumina ceramics and 20 times as high as that of dielectric ceramics. The sapphire is thus ideally suited for electrostatic chucks used for etching and filming apparatuses. Moreover, the single-crystalline sapphire maintains its high strength in the temperature range of room temperature to 1000° C.

Besides, since it is easy to obtain single-crystalline sapphire having a high purity of 99.99%, impurities are prevented from diffusing. As a result, wafers are not contaminated.

For these reasons, it is possible to solve the problems involved in electrostatic chucks composed of resin or polycrystalline ceramics.

Structural Embodiments of the Second Invention

A plurality of structural embodiments of the second invention are explained below (the numbers assigned to the structural embodiments do not necessarily correspond to the numbers assigned to the examples described below). The members corresponding to those of the first invention are denoted by the same reference numerals.

Figure 6:
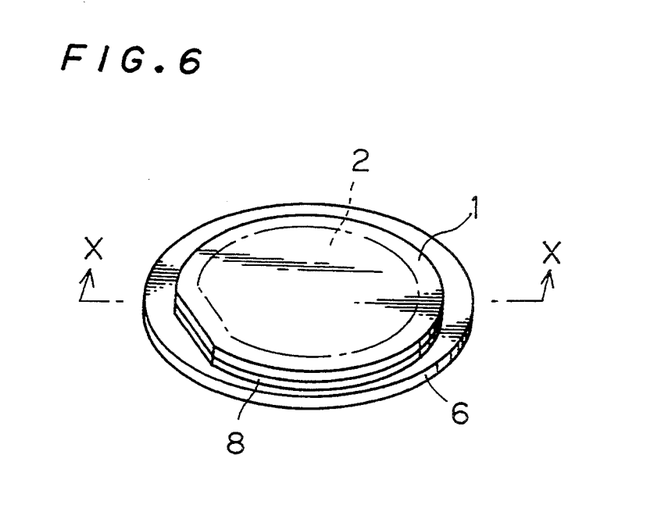
FIG. 6 is a perspective view illustrating the basic electrostatic chuck of the second invention.
Figure 7:
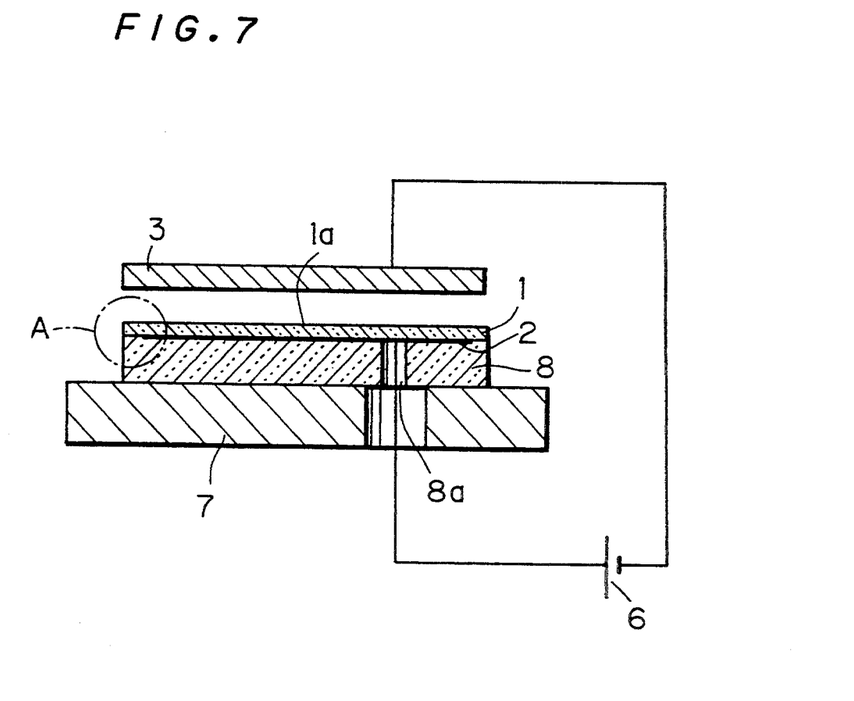
FIG. 7 is an enlarged sectional view taken on line X—X of FIG. 6.
Figure 8:
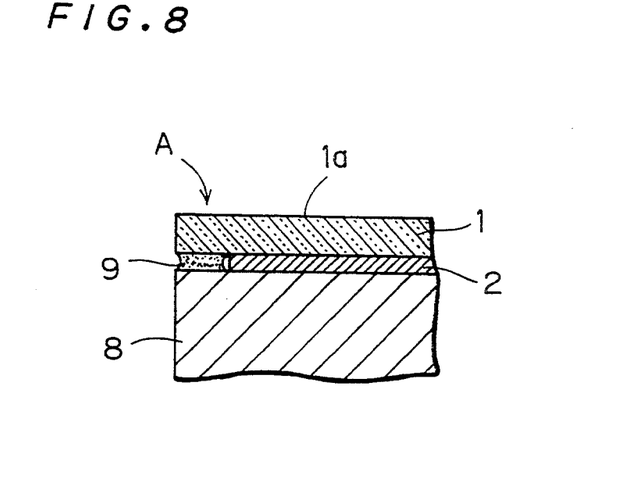
FIG. 8 is an enlarged view of portion A of FIG. 7.

As shown in the perspective view (FIG. 6) and the vertical sectional views (FIGS. 7 and 8), the electrostatic chuck of the first structural embodiment of the second invention is equipped with an electrostatic inner electrode 2 on the bottom surface of a plate-shaped chucking body 1 composed of single-crystalline sapphire, and the electrostatic inner electrode 2 is secured to a substrate 8 also composed of single-crystalline sapphire or one of various ceramics by using a bonding agent 9 or by a high-temperature joining method without using any bonding agent. The bonding agent herein means an organic or inorganic adhesive, or it means a glazing, metallizing, brazing or plating method. An appropriate bonding agent or method should be used selectively according to applications since there are limitations in application temperature and other requirements.

Figure 9:
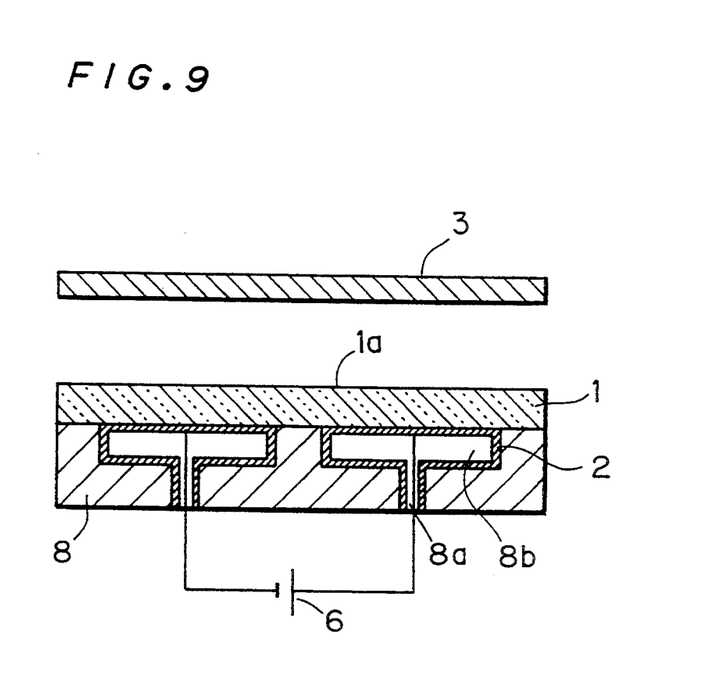
FIG. 9 is a vertical sectional view illustrating a first structural embodiment of the second invention.

The high temperature joining method is a method conducted by direct contact and fusion applied to two mirror-ground single-crystalline sapphire materials or a combination of single-crystalline sapphire material and a polycrystalline alumina ceramics material, both of which are mirror-ground, under pressure at a high temperature, without using any bonding agents, Additionally, an electrode outlet 8a for allowing current to flow to the above-mentioned electrostatic inner electrode 2 is formed in the substrate 8. By applying voltage through this electrode outlet 8a between the electrostatic inner electrode 2 and an object 3 to be chucked, dielectric polarization occurs at the single-crystalline sapphire chucking body 1, and the object 3 can be chucked on the chucking surface 1a by the Coulomb force. Although a unipolar type electrostatic chuck was indicated in this example, a plurality of electrostatic inner electrodes 2 can be formed as shown in FIG. 9. By applying voltage between these two electrostatic inner electrodes 2, the electrostatic chuck can be used as a bipolar type electrostatic chuck.

Still more, although this electrostatic chuck is secured to a pedestal 7 composed of aluminum or the like, the pedestal 7 is not necessarily required.

Since the chucking body 1 is of single-crystalline sapphire, its purity is not less than 99.99%. Because of this extremely low contents of impurities, the sapphire is free from the danger of contaminating wafers or the like to be used as the object 3 to be chucked. In addition, single-crystalline sapphire is superior in dielectric strength at a high temperature and thus does not adversely affect the circuits formed on wafers.

The thickness of the chucking body 1 is set in the range of 0.1 to 0.4 mm. If the thickness is less than 0.1 mm, the chucking body 1 has insufficient strength. If the thickness is more than 0.4 mm, the chucking force is decreased. The chucking surface 1a of the chucking body 1 is a smooth surface having a surface roughness (Rmax) not more than 0.8 s so that strong chucking force can be obtained. Regarding the crystal orientation of the single-crystalline sapphire for the chucking body 1, axis C is preferred to be vertical to the chucking surface 1a. However, other crystal orientations can also be used. This kind of single-crystalline sapphire can be produced by the EFG method or the like and can be formed in a predetermined shape and size.

As the material for the above-mentioned electrostatic inner electrode 2, palladium (Pd), platinum (Pt), nickel (Ni) and other mixtures can be used. Any materials can be used as long as they are electric conductors. In the case of the conventional electrostatic chucks composed of polycrystalline ceramics, it was general that a plate-shaped chucking body and an electrostatic inner electrode are integrated by firing. In the case of the second invention, since the electrostatic inner electrode 2 is formed after the chucking body 1 is made, the electrostatic inner electrode 2 is not necessarily required to be made of a metal having resistance against oxidation during sintering at a high temperature.

As shown in FIG. 9 for illustrating the second structural embodiment of the second invention, the plate 1 as a chucking body composed of single-crystalline sapphire and the substrate 8 composed of alumina ceramics are directly joined. The grooves 8b previously formed in the shape of an electrode pattern inside the substrate 8 are subjected to electroless plating through the electrode outlet 8a to form a bipolar type electrostatic inner electrode 2 having a pair (right and left) of electrodes.

Figure 10:
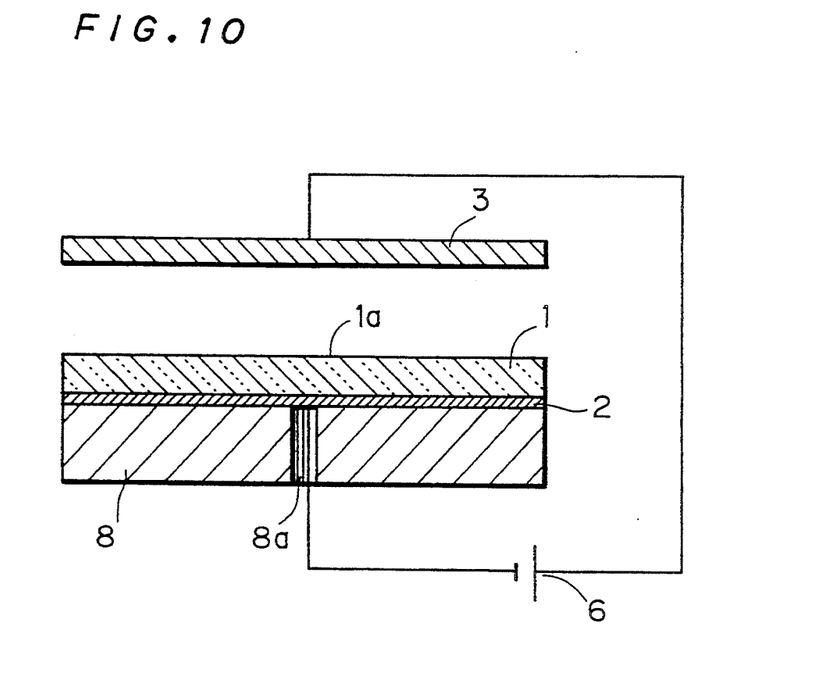
FIG. 10 is a vertical sectional view of second and third structural embodiments of the second invention.

Furthermore, as shown in FIG. 10 for illustrating the third structural embodiment of the second invention, the plate 1 composed of single-crystalline sapphire and the substrate 8 composed of alumina ceramics are joined by the Mo-Mn metalizing method or by using an active metal composed of a titanium alloy, and this metallized layer or active metallic layer can be used as the electrostatic inner electrode 2.

Figure 11:
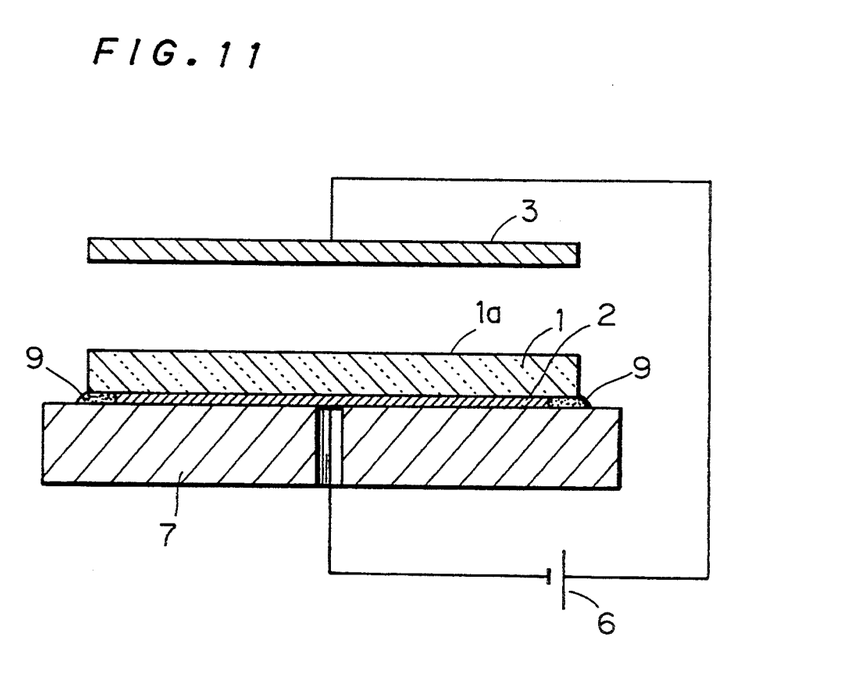
FIG. 11 is a vertical sectional view of a fifth structural embodiment of the second invention.

The electrostatic inner electrode 2 is not necessarily required to be embedded between the single-crystalline sapphire plate 1 and the substrate 8. For example, as shown in FIG. 11 for illustrating the fourth structural embodiment of the second invention, the electrostatic inner electrode 2 can be formed on the side opposite to the chucking surface 1a of the plate 1 and then a dielectric pedestal 7 can be secured under the electrostatic inner electrode 2 using a bonding agent 9. As the above-mentioned bonding agent 9, adhesive, glass, silicon resin or the like can be used. The pedestal 7 can be composed of a metal such as aluminum, or polycrystalline ceramics such as alumina and forsterite, or single-crystalline sapphire.

Figure 12:
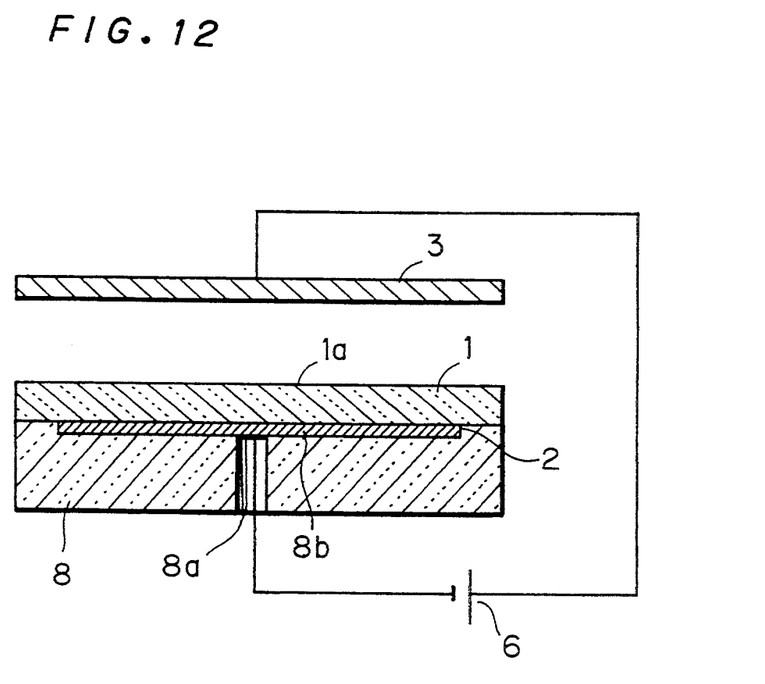
FIG. 12 is a vertical sectional view illustrating a fourth structural embodiment of the second invention.

Moreover, as shown in FIG. 12 for illustrating the fifth structural embodiment of the second invention, a groove 8b is previously formed in the substrate 8 composed of single-crystalline sapphire or polycrystalline ceramics so that the groove has the shape of an electrode. In this groove 4b, paste composed of W or Mo-Mn Is filled and fired to form the electrostatic inner electrode 2. On the top surface of the electrostatic inner electrode 2, the single-crystalline sapphire plate 1 can then be placed and joined by high temperature fusion.

Examples of the Second Invention (Example 1)

As an example of the second invention, the electrostatic chuck shown in FIG. 9 was made as a sample. The single-crystalline sapphire plate 1 was made in a plate shape having a diameter of 6 inches and a thickness of 0.2 mm by taking up single-crystalline sapphire having a width of 6 inches using the EFG (Edge-defined Film-fed Growth) method. The physical property values of the sapphire made at this time are listed in Table 4 and the purity values thereof are listed in Table 5.

[TABLE 4]

| Physical properties | |
| --- | --- |
| Crystal system | Hexagonal system<br>a = 4.763Å c = 13.003Å |
| Density | $3.97 \times 10^3$ kg/mm$^3$ |
| Hardness | Mohs hardness 9<br>Vickers hardness 2300 |
| Tensile strength | 2250 MPa |
| Compressive strength | 2950 MPa |
| Young's modulus | $4.7 \times 10^5$ MPa |
| Flexural strength | 690 MPa |
| Thermal properties | |
| Melting point | 2053° C. |
| Thermal expansion coefficient (25° C.) | $5.3 \times 10^{-6}$/K (Parallel to axis C)<br>$4.5 \times 10^{-6}$/K (Perpendicular to axis C) |
| Heat conductivity | 42 W/m · K (25° C.) |
| Specific heat | 0.75 kJ/kg · K (25° C.) |
| Radiation heat | Not more than 0.02<br>($\lambda$ = 2.6~3.7 $\mu$m) |
| Electrical properties | |
| Electric resistance | $1 \times 10^{14}$ Ω · m (Room temperature)<br>$1 \times 10^9$ Ω · m (500° C.) |
| Dielectric constant | 11.5 (Parallel to axis C)<br>9.3 (Perpendicular to axix C)<br>($10^3 \sim 10^{10}$ Hz) |
| Dielectric strength | $4.8 \times 10^4$ kV/s (60 Hz) |
| Dielectric loss coefficient | Not more than $10^{-4}$ |

[TABLE 5]

| | Al$_2$O$_3$ 99.99% | | | | | | | |
| --- | --- | --- | --- | --- | --- | --- | --- | --- |
| Impurity | Na | Si | Ca | Fe | Mg | S | K | Cr |
| Content (ppm) | 1 | 15 | 2 | 3 | 3 | 5 | 2 | 1 |

In the same way, a single-crystalline sapphire substrate 8 (having a diameter of 6 inches and a thickness of 3 mm) was made by using the EFG method. In the substrate 8, electrode outlets 8a were formed as holes. Grooves 8b having a depth of 0.1 mm were then formed so that each of the grooves was able to have a shape of an electrostatic inner electrode. The joining surfaces of the plate 1 and the substrate 8 were subjected to mirror-grinding and fitting processes, then fused at 1800° C. The grooves were then subjected to electroless nickel plating through the electrode outlet 8a to form electrostatic inner electrodes 2.

Although a bipolar type electrostatic chuck is shown in FIG. 9, a unipolar type was used for the chucking experiment.

(Example 2)

As the second example of the second invention, the electrostatic chuck shown in FIG. 10 was made as a trial product.

A plate 1 and a substrate 8 were formed by using the same single-crystalline sapphire as that used for the example 1, and these were joined by the Mo-Mn metallizing method. In this case, the Mo-Mn metalized layer obtained by this method is used as an electrostatic inner electrode 2.

(Example 3)

To make the electrostatic chuck shown in FIG. 10 as the third example, a plate 1 was formed by using of the same single-crystalline sapphire as that used for the example 1, and a substrate 8 composed of 99.5% of alumina polycrystalline ceramics was formed. These were joined by using the Mo-Mn metallizing method. In this case, the Mo-Mn metalized layer obtained by this method is used as an electrostatic inner electrode 2.

(Example 4)

As the fourth example of the second invention, the electrostatic chuck shown in FIG. 12 was made as a trial product.

A plate 1 was made by using the same single-crystalline sapphire as that used for the example 1, and a substrate 8 composed of 99.5% of alumina polycrystalline ceramics was formed. An electrode outlet 8a was provided in the substrate 8. A groove 8b having a depth of 0.1 mm was formed in the shape of an electrode on the surface of the substrate 8. After W (tungsten) paste was filled in the groove 8b, the substrate 8 was fired. The joining surfaces of the plate 1 and the substrate 8 were then subjected to mirror-grinding and fitting processes, then fused at 1800° C. in a reduction furnace.

(Example 5)

As the fifth example of the second invention, the electrostatic chuck shown in FIG. 11 was made as a trial product.

A plate 1 was made by using the same single-crystalline sapphire as that used for the example 1. The bottom surface of the plate 1 was subjected to electroless nickel plating to form an electrostatic inner electrode 2. By using epoxy resin, the plate 1 was joined to a pedestal 7 composed of high-purity aluminum, the surface of which had been subjected to alumite (anodized aluminum layer) processing, to make an electrostatic chuck which is used at room temperature.

(Test Example)

Chucking force tests were conducted by using the electrostatic chucks of the above-mentioned examples 1 to 5 in the voltage range of 0 to 2 kV at a vacuum of $10^{-3}$ Torr and at a room temperature of 24° C.

As a control test, an electrostatic chuck composed of polyimide resin, an electrostatic chuck composed of 99.5% of polycrystalline alumina ceramics, an electrostatic chuck composed of Ti-added polycrystalline alumina ceramics and an electrostatic chuck composed of barium titanate were tested as controls.

Regarding the purity of the wafer chucking surface, elements which adversely affect semiconductor devices, such as alkaline metals, alkaline earth metals and heavy metals, were regarded as impurities. The purity was judged by checking whether the ingredients (Si, Al, C, N and O) other than the above-mentioned impurities accounted for not less than 99.9%.

Wafer chucking force was measured at a vacuum of $10^{-2}$ Torr. A 1-inch square wafer was taken up vertically and the force exerted at the time of release was measured with a load cell. The force value was divided by the area of the wafer to obtain the chucking force.

A chucking force of 100 kg/cm$^2$ is desired to be obtained in the case of a unipolar type. It is preferable that a force of 100 kg/cm$^2$ is obtained both at room temperature and at 500° C. However, it is acceptable if the value is obtained at either temperature. The voltage to be applied is acceptable if it is not more than 2000 V.

The test results are listed in Table 6.

[TABLE 6]

| A Sample | Purity of chucking surface, not less than 99.9% | Temperature | Chucking force of wafer (kg/cm²) Applied voltage (V) | | | |
|---|---|---|---|---|---|---|
| | | | 500 | 1000 | 1500 | 2000 |
| B Example 1 | o | R.T. | 20 | 50 | 100 | 200 |
| | | 500° C. | 50 | 100 | 200 | 500 |
| Example 2 | o | R.T. | 20 | 50 | 100 | 200 |
| | | 500° C. | 50 | 100 | 200 | 500 |
| Example 3 | o | R.T. | 20 | 50 | 100 | 200 |
| | | 500° C. | 50 | 100 | 200 | 500 |
| Example 4 | o | R.T. | 20 | 50 | 100 | 200 |
| | | 500° C. | 50 | 100 | 200 | 500 |
| Example 5 | o | R.T. | 20 | 50 | 100 | 200 |
| | | 500° C. | (not usable at high temperatures because of low heat resistance) | | | |
| C Polyimide resin | o | R.T. | 20 | (Dielectric breakdown) | | |
| | | 500° C. | (not usable at high temperatures becuase of low heat resistance) | | | |
| 99% of polycrystalline alumina | o | R.T. | 20 | 50 | (Dielectric breakdown) | |
| | | 500° C. | 50 | 100 | (Dielectric breakdown) | |
| Ti-added polyerystalline alumina | x | R.T. | 50 | (increased leak current) | | |
| | | 500° C. | (not usable because of increased leak current) | | | |
| Barium titanate | x | R.T. | 50 | 100 | (Dieletric breakdown) | |
| | | 500° C. | (not usable because of increased leak current | | | |

A: Classification
B: Examples of second invention
C: Comparison examples
R.T. = Room temperature: 24° C.

A: Classification
B: Examples of second invention
C: Comparison examples
R.T.=Room temperature: 24° C.
(Note) The dielectric breakdown occurred at 500° C. in the case of the example 5 was not caused by any defect in sapphire but by the insufficient heat resistance of the aluminum pedestal of the example.

As shown in Table 6, it is understood that all the electrostatic chucks of the second invention composed of single-crystalline sapphire are high in purity, have a sufficient chucking force not less than 100 kg/cm² and can sufficiently withstand the conditions required for use in semiconductor production apparatuses.

The current flowing between the electrostatic inner electrode 2 and the object 3 to be chucked was in the range of several to several tens μA. It is thus confirmed that the level is sufficiently low and does not cause any problem.

The electrostatic chucks composed of sapphire were subject to tests in conditions other than those listed in Table 6. As the results of the tests, it is understood that the electrostatic chucks can be used in the high voltage range of 1000 to 4000 V at room temperature.

We claim:

1. An electrostatic chuck, comprising:
a chuck body for generating a chucking force by means of minimal leak current, the chuck body comprising dielectric ceramic having a volume resistivity value not greater than approximately $10^{13}$ Ωcm at a high temperature of not less than approximately 250° C., and
an electrostatic inner electrode embedded in the chuck body.

2. The electrostatic chuck of claim 1, wherein the dielectric ceramic has a volume resistivity value not less than approximately $10^8$ Ωcm.

3. The electrostatic chuck of claim 1, wherein the dielectric ceramic comprises a material selected from the group consisting of polycrystalline alumina ceramic, aluminum nitride ceramic and silicon nitride ceramic.

4. An electrostatic chuck, comprising:
a chuck body of dielectric ceramic, and
an electrostatic inner electrode embedded in the chuck body,
the dielectric ceramic having a volume resistivity value not greater than approximately $10^{13}$ Ωcm at a high temperature of not less than approximately 250° C., the dielectric ceramic comprising a material selected from the group consisting of polycrystalline alumina ceramic, aluminum nitride ceramic and silicon nitride ceramic, the dielectric ceramic comprising approximately 85 weight % of at least one of alumina, aluminum nitride and silicon nitride as a main ingredient and comprising not more than approximately 0.2 weight % of impurities other than aluminum, silicon, oxygen and nitrogen.

5. An electrostatic chuck, comprising:
a chuck body comprising a single-crystalline sapphire plate having a first surface and a second surface, the first surface of the sapphire plate forming a chucking surface having a surface roughness of not more than 0.8 S,
a dielectric plate, and
an electrostatic inner electrode for coupling the dielectric plate with the second surface of the sapphire plate.

6. The electrostatic chuck of claim 5, wherein the single-crystalline sapphire is formed in accordance with the Edge-defined Film-fed Growth (EFG) method.

7. The electrostatic chuck of claim 5, wherein the electrostatic inner electrode comprises at least one of a unipolar type electrode and a bipolar type electrode.

8. An electrostatic chuck for at least one of fixing and carrying semiconductor wafers at a high temperature of not less than approximately 250° C., the electrostatic chuck comprising:
  a chuck body for generating a chucking force by means of minimal leak current, the chuck body comprising dielectric ceramic having a volume resistivity value not greater than approximately $10^{13}$ Ωcm at a high temperature of not less than approximately 250° C., and
  an electrostatic inner electrode embedded in the chuck body.

9. The electrostatic chuck of claim 8, wherein the dielectric ceramic comprises a material selected from the group consisting of polycrystalline alumina ceramic, aluminum nitride ceramic and silicon nitride ceramic.

10. An electrostatic chuck for at least one of fixing and carrying semiconductor wafers under a vacuum processing condition at a temperature ranging from approximately room temperature to approximately 500° C., the electrostatic chuck comprising:
  a chuck body comprising a single-crystalline sapphire plate having a first surface and a second surface, the first surface of the sapphire plate forming a chucking surface having a surface roughness of not more than 0.8 S,
  a dielectric plate, and
  an electrostatic inner electrode for coupling the dielectric plate with the second surface of the sapphire plate.

11. The electrostatic chuck of claim 10, wherein the processing condition comprises a high voltage ranging from approximately 500 V to 2000 V.

12. An electrostatic chuck according to any of claims 8 through 11, wherein the processing condition is a wafer processing condition selected from the group consisting of those for lithographic electron beam drawing, dry etching, chemical vapor deposition and physical vapor deposition methods.

* * * * *